US012306657B2

(12) United States Patent
Sasaki

(10) Patent No.: US 12,306,657 B2
(45) Date of Patent: May 20, 2025

(54) ROTATING OPERATION PART AND ACOUSTIC DEVICE

(71) Applicant: AlphaTheta Corporation, Yokohama (JP)

(72) Inventor: Kenji Sasaki, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 0 days.

(21) Appl. No.: 18/264,166

(22) PCT Filed: Feb. 8, 2021

(86) PCT No.: PCT/JP2021/004605
§ 371 (c)(1),
(2) Date: Aug. 3, 2023

(87) PCT Pub. No.: WO2022/168316
PCT Pub. Date: Aug. 11, 2022

(65) Prior Publication Data

US 2024/0094760 A1 Mar. 21, 2024

(51) Int. Cl.
*G05G 1/08* (2006.01)
*G05G 5/00* (2006.01)
*H01H 19/14* (2006.01)

(52) U.S. Cl.
CPC ............... *G05G 1/08* (2013.01); *G05G 5/005* (2013.01); *G05G 2505/00* (2013.01); *H01H 19/14* (2013.01)

(58) Field of Classification Search
CPC .. G05G 1/08; G05G 1/10; G05G 1/12; G05G 5/005; G05G 2505/00; H01H 3/10; H01H 19/14
See application file for complete search history.

(56) References Cited

U.S. PATENT DOCUMENTS

| | | | | |
|---|---|---|---|---|
| 2,625,054 A * | 1/1953 | Bauman | G05G 1/12 | 74/553 |
| 3,064,494 A * | 11/1962 | Brewster | G05G 1/12 | 74/504 |
| 8,579,141 B2 * | 11/2013 | Tejima | G05G 1/10 | 215/230 |

(Continued)

FOREIGN PATENT DOCUMENTS

| | | | |
|---|---|---|---|
| DE | 2123613 A1 * 11/1972 | | G05G 1/12 |
| GB | 366729 A * 2/1932 | | G05G 1/12 |

(Continued)

OTHER PUBLICATIONS

International Search Report dated Apr. 20, 2021 issued in International application No. PCT/JP2021/004605; English translation included (4 pages).

(Continued)

*Primary Examiner* — Thomas C Diaz
(74) *Attorney, Agent, or Firm* — Rankin, Hill & Clark LLP

(57) ABSTRACT

A rotary operator includes a rotary member, an operation knob capped on the rotary member in a first direction, and a locking member including a first portion fitted in a side of the operation knob opposite from the rotary member in the first direction and a second portion extending in a second direction orthogonal to the first direction to be engaged with the rotary member.

9 Claims, 3 Drawing Sheets

(56) References Cited

U.S. PATENT DOCUMENTS

2013/0092692 A1* 4/2013 Tejima .................... G05G 1/10
220/326

FOREIGN PATENT DOCUMENTS

| | | | | | |
|---|---|---|---|---|---|
| GB | 958442 | A | * | 7/1962 | ............... H01H 3/10 |
| JP | 64-54113 | U | | 4/1989 | |
| JP | 2-100302 | A | | 4/1990 | |
| JP | 3-109239 | U | | 11/1991 | |
| JP | 2007-179882 | A | | 7/2007 | |

OTHER PUBLICATIONS

International Preliminary Report on Patentability dated Aug. 3, 2023, Application No. PCT/JP2021/004605, 5 pages.

* cited by examiner

ROTATING OPERATION PART AND ACOUSTIC DEVICE

TECHNICAL FIELD

The present invention relates to a rotary operator and an acoustic device.

BACKGROUND ART

A rotary operator has been used in various devices. For instance, Patent Literature 1 discloses a rotary electric component capable of improving dimensional accuracy of a rotary shaft, on which an operation knob is attached, thereby allowing reliable attachment of the operation knob.

CITATION LIST

Patent Literature(s)

Patent Literature 1: JP 2007-179882 A

SUMMARY OF THE INVENTION

Problem(s) to be Solved by the Invention

In addition to dimensional accuracy, there are various demands for the rotary operator depending on the usage thereof. For instance, durability for preventing easy detachment and/or damage even against a hard action by a user (e.g. DJ) and good operational feeling for enhancing playability are often demanded for a rotary operator used in an acoustic device. In this regard, for instance, when a friction force between a rotary shaft and an operation knob is increased in order to prevent the operation knob from being easily detached, it sometimes occurs that productivity is lowered and component(s) including the rotary shaft is damaged because an excessive force is necessarily applied in attaching the operation knob onto the rotary shaft. Further, since there is also a demand for easily replacing the rotary operator for the convenience of replacement of consumable parts and customization, it is not desirable that an excessive force is necessary in order to attach the operation knob.

An object of the invention is to provide a rotary operator capable of being easily attached/detached while keeping durability and operational feeling, and an acoustic device including the rotary operator.

Means for Solving the Problem(s)

[1] A rotary operator including: a rotary member; an operation knob capped on the rotary member in a first direction; and a locking member including a first portion and a second portion, the first portion being fitted in a side of the operation knob opposite from the rotary member in the first direction, the second portion extending in a second direction orthogonal to the first direction to be engaged with the rotary member.

[2] The rotary operator according to [1], in which the first direction is a direction along a rotation axis of the rotary member.

[3] The rotary operator according to [1] or [2], in which in the locking member fitted in the operation knob, at least a part of the first portion includes an exposed portion that is exposed to an outside of the operation knob.

[4] The rotary operator according to [3], in which the exposed portion is exposed on a side of the operation knob opposite from the rotary member.

[5] The rotary operator according to [3] or [4], in which the exposed portion extends on the side of the operation knob opposite from the rotary member from a point intersecting the rotation axis of the rotary member in a direction orthogonal to the rotation axis.

[6] The rotary operator according to any one of [1] to [5], in which the rotary member includes: a rotary shaft capped with the operation knob; and a cover covering the rotary shaft and rotatable integrally with the rotary shaft, and the locking member is configured to lock the cover to the operation knob.

[7] An acoustic device including the rotary operator according to any one of [1] to [6].

DESCRIPTION OF EMBODIMENT(S)

An exemplary embodiment of the invention will be described below with reference to the attached drawings.

Overall Configuration

Figure 1:
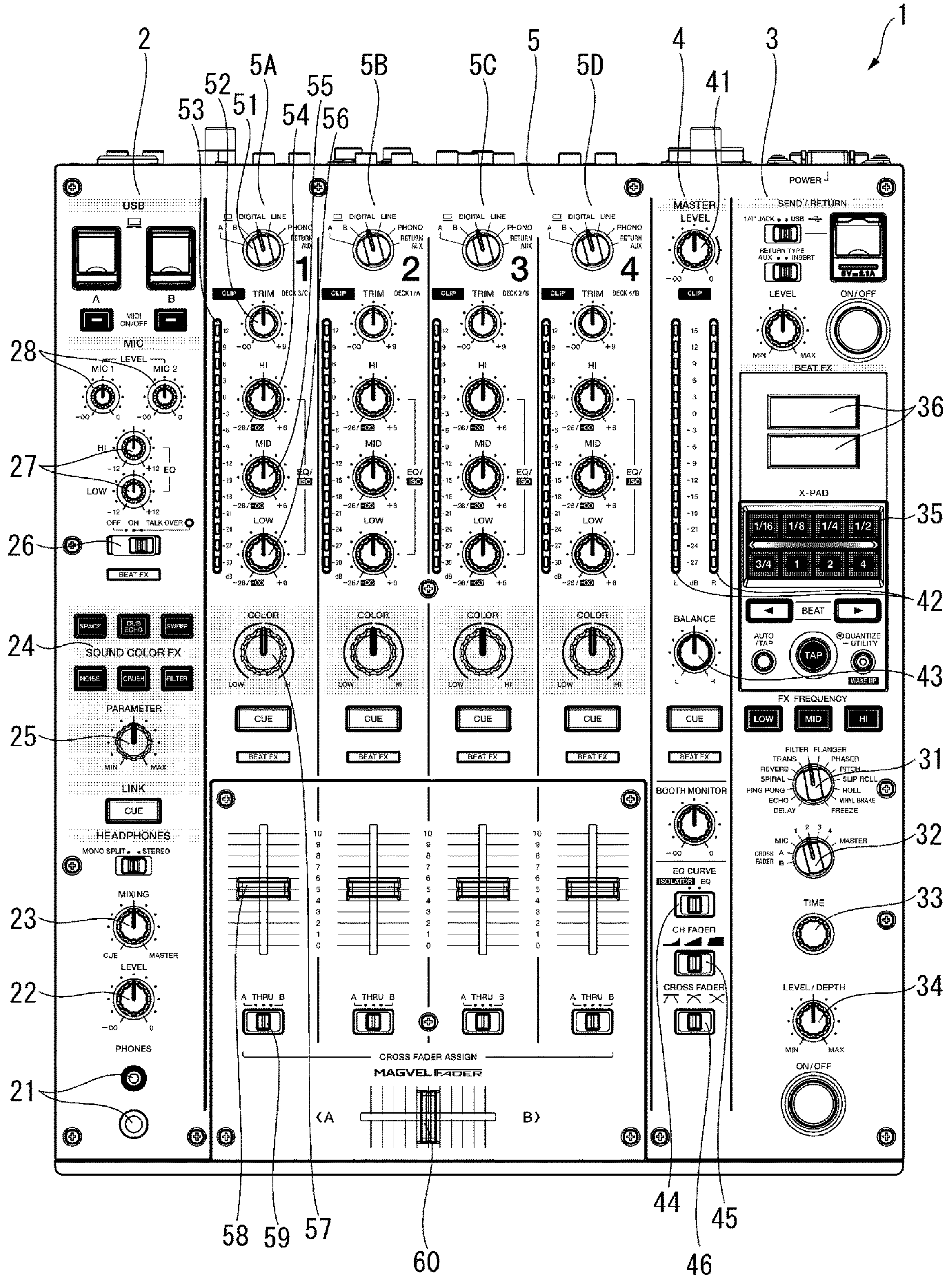
FIG. 1 is a top plan view depicting an arrangement of a DJ mixer according to an exemplary embodiment of the invention.

FIG. 1 depicts a DJ mixer 1 according to a first exemplary embodiment of the invention. Though not illustrated, a music player (e.g. a vinyl record player, CD player, and computer) for playing music data and a music controller (e.g. DJ controller) are connected to an input of the DJ mixer 1. Further, an acoustic device (e.g. a speaker) is connected to an output of the DJ mixer 1.

The DJ mixer 1 as the acoustic device is configured to receive music data in a form of sound signals played by the music player and the music controller and perform effect processing on the inputted music data. Further, the DJ mixer 1 amplifies the music data having been subjected to the effect processing, converts the music data into analog signals, and then outputs sound from the acoustic device.

The DJ mixer 1 includes a microphone operating unit 2, an effect operating unit 3, a master adjuster 4, and an equalizer adjuster 5.

The microphone operating unit 2 includes operation elements for adjusting an output sound volume of a microphone (not illustrated) connected to the DJ mixer 1 and for starting/stopping the effect processing performed by the effect operating unit 3. In addition, the microphone operating unit 2 includes a terminal, with which a user connects a headphone, to monitor the sound volume of the music data outputted by the DJ mixer 1. Specifically, the microphone operating unit 2 includes a headphone jack 21, a headphone sound volume adjuster 22, a mixing adjuster 23, a master effect switching unit 24, a master effect amount adjuster 25, a microphone switching unit 26, a microphone equalizer adjuster 27, and a microphone sound volume adjuster 28.

A headphone is connected to the headphone jack 21. The user of the DJ mixer 1 monitors, through the headphone, the music data outputted from each channel and final music data outputted from the master adjuster 4.

The headphone sound volume adjuster 22 adjusts the sound volume outputted from the headphone.

The mixing adjuster 23 adjusts balance between an output sound volume of a channel whose CUE button is pressed and a sound volume of a master channel, both of the sound volumes being outputted from the headphone.

The master effect switching unit 24 selects effects to be applied to the entirety of the music data inputted from all of the channels connected to the equalizer adjuster 5. In the present exemplary embodiment, effects such as noise, sweep, and crush are selectable.

The master effect amount adjuster 25 adjusts the applied amount and the depth of the effect selected by the master effect switching unit 24.

The microphone switching unit 26 switches on/off the microphone connected to the DJ mixer 1. The microphone equalizer adjuster 27 adjusts the output sound volume of acoustic data outputted from the microphone in accordance with frequency.

The microphone sound volume adjuster 28 adjusts the output sound volume of acoustic data outputted from the microphone.

The effect operating unit 3 includes operation elements for performing effect processing on the inputted music data. Specifically, the effect operating unit 3 includes an effect switching unit 31, a channel switching unit 32, an effect time setting unit 33, an effect amount adjuster 34, a magnification setting unit 35, and a display unit 36.

The effect switching unit 31 is a switch for selecting the effect to be applied on the music data. With this operation on the effect switching unit 31, the effect processing such as echo, delay, reverb, and flanger can be selected.

The channel switching unit 32 selects, from among music data inputted to a plurality of channels provided in the equalizer adjuster 5, one of the music data, on which the effect is to be applied.

The effect time setting unit 33 sets the time for applying the effect on the music data, the effect having been selected by the effect switching unit 31.

The effect amount adjuster 34 adjusts the applied amount and the depth of the effect having been selected by the effect switching unit 31.

The magnification setting unit 35 sets beat magnification, at which timings for applying the effect are synchronized, based on BPM of the inputted music data. The magnification setting unit 35 can apply the effect on the music data at the timings in synchronization with, for instance, one beat, two beats, ½ beat or ¼ beat of the BPM of the music data.

The display unit 36 displays the selected effect and BPM of the inputted music data for visual recognition by the user. In the present exemplary embodiment, the name of the effect selected by the effect switching unit 31, the BPM of the music data, and the beat magnification set by the magnification setting unit 35 are displayed.

The master adjuster 4 includes operation elements for applying the effect outputted by the DJ mixer 1 and controlling the entirety of the amplified music data. Specifically, the master adjuster 4 includes a master sound volume adjuster 41, a level indicator 42, a master sound volume balance adjuster 43, an equalizer switching unit 44, a channel fader switching unit 45, and a cross fader switching unit 46.

The master sound volume adjuster 41 adjusts the output sound volume of the entirety of the music data outputted from the DJ mixer 1.

The level indicator 42 displays the right and left output sound volumes of the music data outputted from the DJ mixer 1.

The channel fader switching unit 45 switches curve characteristics of a later-described channel fader 58.

The cross fader switching unit 46 switches the curve characteristics in a switching operation by a later-described cross fader 60. For instance, the cross fader switching unit 46 is configured to, upon the switching operation by the cross fader 60, directly switch from the curve characteristics before the switching operation to the curve characteristics after the switching operation, or switch the curve characteristics with a period interposed between before the switching operation and after the switching operation, the period during which the respective sounds for the switching operations are outputted at a half volume.

The equalizer adjuster 5 includes operation elements for applying equalizer processing on the music data inputted from the music player connected to the DJ mixer 1 for each of the channels. Specifically, the equalizer adjuster 5 includes first to fourth adjusting unit 5A to 5D configured to control the corresponding four channels (channel 1 to channel 4).

The music player and the music controller are connected to each of the first adjusting unit 5A to the fourth adjusting unit 5D. Each of the first adjusting unit 5A to fourth adjusting unit 5D can perform equalizer adjustment. Each of the first adjusting unit 5A to the fourth adjusting unit 5D includes an input switching unit 51, an input channel sound volume adjuster 52, a channel level indicator 53, a high frequency band adjuster 54, a medium frequency band adjuster 55, a low frequency band adjuster 56, an effect adjuster 57, a channel fader 58, and a cross fader switching unit 59. The equalizer adjuster 5 further includes the cross fader 60.

The input switching unit 51 switches input sources of the music player and the music controller connected to the DJ mixer 1. The DJ mixer 1 is provided with a phono jack, a line jack, and a USB jack. The input switching unit 51 switches connected devices such as a vinyl record player connected to the phono jack, a CD player connected to the line jack, and a computer connected to the USB jack.

The input channel sound volume adjuster 52 adjusts an input sound volume of the connected device selected by the input switching unit 51.

The channel level indicator 53 displays the input sound volume of the music data inputted from the connected device.

The high frequency band adjuster 54 adjusts the sound volume in a high-frequency range of the inputted music data. The high-frequency range, in which the sound volume is adjusted, refers to, for instance, a frequency range of 4649 Hz or more.

The medium frequency band adjuster 55 adjusts the sound volume in a medium-frequency range of the inputted music data. The medium-frequency range, in which the sound volume is adjusted, refers to, for instance, a frequency range exceeding 284 Hz and less than 4649 Hz.

The low frequency band adjuster 56 adjusts the sound volume in a low-frequency range of the inputted music data. The low-frequency range, in which the sound volume is adjusted, refers to, for instance, a frequency range of 284 Hz or less.

The effect adjuster 57 adjusts the applied amount and the depth of the effect that is set for each of the first to fourth adjusting unit 5A to 5D.

The channel fader 58 adjusts the output sound volume outputted by each of the first to fourth adjusting unit 5A to 5D.

The cross fader switching unit 59 switches an output target of the first to fourth adjusting unit 5A to 5D to an A side (right side) or B side (left side) of the cross fader 60.

The cross fader 60 switches between the music piece outputted from the channel switched to the A side (right side) and the music piece outputted from the channel switched to the B side (left side).

Detailed Structure of Effect Adjuster 57

Figure 2:
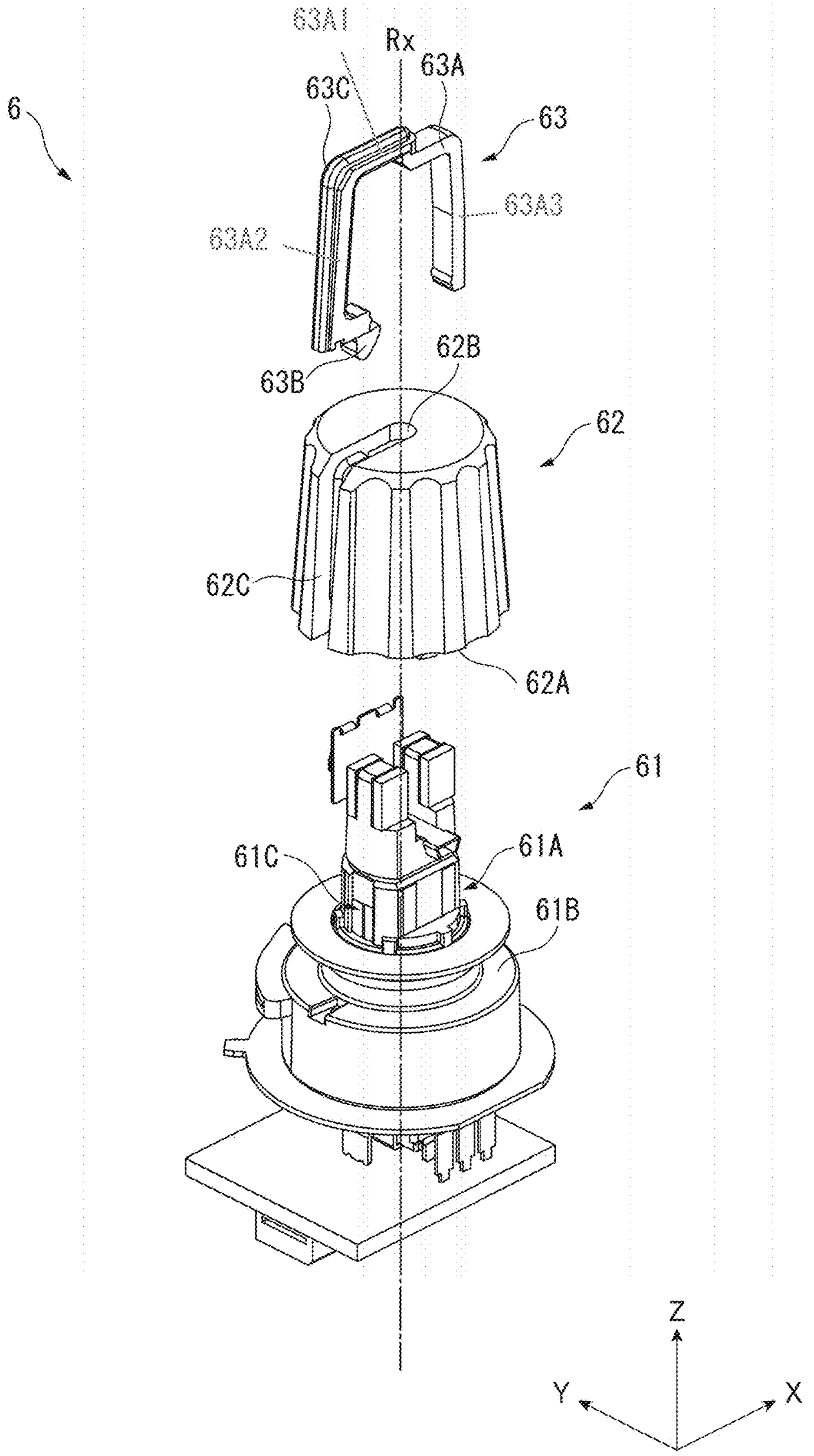
FIG. 2 is a perspective view depicting a configuration of an operation element according to the exemplary embodiment of the invention.

FIG. 2 is a perspective view showing a structure of the controller knob 6 forming the effect adjuster 57. As illustrated in FIG. 2, the controller knob 6 includes a rotary member 61, an operation knob 62 capped on the rotary member 61 in a manner capable of attachment and detachment, and a locking member 63 for locking the rotary member 61 and the operation knob 62 with each other. It should be noted that at least the operation knob 62 and the locking member 63 are preferably differently colored or made of different materials for visual distinction.

The rotary member 61 includes a rotary shaft 61A, on which the operation knob 62 can be capped (i.e. attachable), and a cover 61B covering the rotary shaft 61A and integrally rotatable with the rotary shaft 61A. The cover 61B is provided with, at a part thereof, a recess 61C capable of receiving a part of a later-described locking member 63.

The operation knob 62 includes an insertion portion 62A into which a part of the rotary member 61 is insertable, a hole 62B into which a part of the locking member 63 is insertable, and a groove 62C in which a part of the locking member 63 is fitted.

The locking member 63 includes: a U-shaped body 63A fitted with a side of the operation knob 62 opposite from the rotary member 61; and a engagement portion 63B engageable with the rotary member 61. The body 63A has an exposed portion 63C.

It should be noted that mutually orthogonal three directions will be referred to as an X direction, Y direction, and Z direction hereinafter. Of the three directions, the Z direction (first direction) is a direction along a rotation axis Rx of the rotary member 61, which is a direction for the operation knob 62 to be detached. The operation knob 62 is capped on the rotary member 61 in the Z direction (first direction). The X direction (second direction) and the Y direction are directions orthogonal to each other and orthogonal to the direction for the operation knob 62 to be detached.

The body 63A includes a base 63A1 extending in the X direction, a first extending portion 63A2, and a second extending portion 63A3, the first and second extending portions 63A2 and 63A3 extending from ends of the base 63A in the Z direction in which the operation knob 62 is capped. The engagement portion 63B extends from an end of the first extending portion 63A2 toward the second extending portion 63A3.

Figure 3:
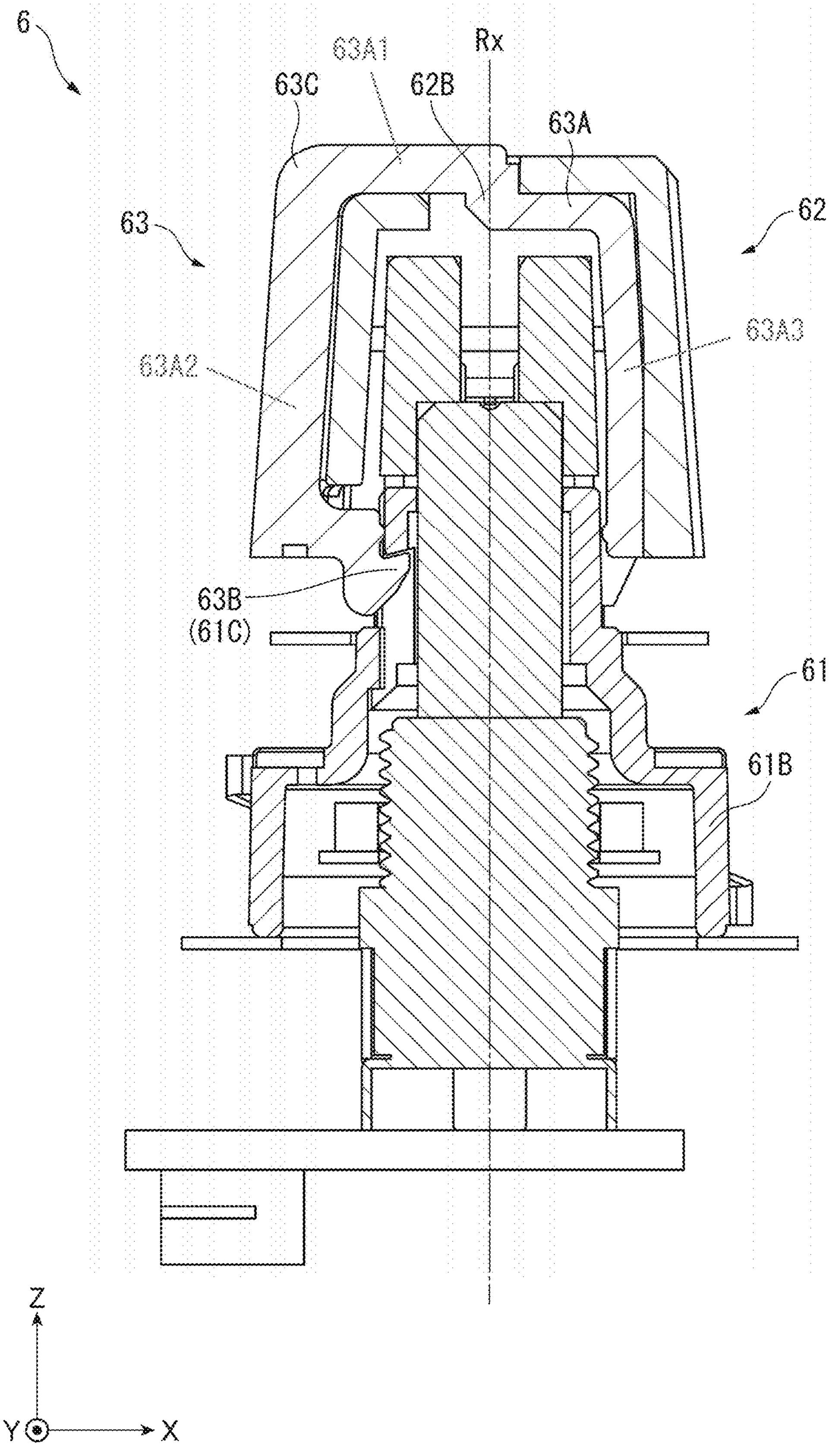
FIG. 3 is a cross-sectional view depicting an operation knob in an attached state according to the exemplary embodiment of the invention.

FIG. 3 is a cross-sectional view taken along an X-Z plane with the operation knob 62 being attached.

In order to attach the operation knob 62, an end of the body 63A, which is an end of the locking member 63 opposite from the engagement portion 63B, is inserted into the hole 62B of the operation knob 62. A part of the body 63A of the locking member 63 is fitted to an inside of the operation knob 62. The exposed portion 63C of the body 63A of the locking member 63 is fitted in the groove 62C of the operation knob 62 to be exposed on the operation knob 62.

Further, the insertion portion 62A of the operation knob 62 is capped on an end (i.e. an end onto which the operation knob 62 is attached) of the rotary shaft 61A of the rotary member 61. Then, the engagement portion 63B of the locking member 63 is engaged with the recess 61C of the rotary member 61.

As illustrated in FIG. 3, while the operation knob 62 is attached on the rotary member 61, a part of the body 63A of the locking member 63 is fitted to the inside of the operation knob 62, so that the locking member 63 is locked in the operation knob 62 to the extent to restrain rattling.

Further, the engagement portion 63B of the locking member 63 extends in the X direction (second direction) to be engaged with the recess 61C of the rotary member 61. Accordingly, while the operation knob 62 is attached on the rotary member 61, the engagement portion 63B of the locking member 63 is engaged with the recess 61C of the rotary member 61, thereby locking the rotary member 61 with the locking member 63. As a result, the rotary member 61 and the operation knob 62 are locked with a side of the locking member 63 close to the rotary member 61 and a side of the locking member 63 opposite from the rotary member 61.

When one tries to detach the operation knob 62 in this state in the Z direction, a hook-shaped portion of the engagement portion 63B of the locking member 63, which is engaged with the recess 61C of the rotary member 61 to lock the operation knob 62, prevents the operation knob 62 from being detached. In other words, the locking member 63 serves as a fixing pin for locking the rotary member 61 and the operation knob 62.

In contrast, in order to detach the operation knob 62, the engagement portion 63B is moved in the X direction while a part of the locking member 63 close to the exposed portion 63C is bent, thereby disengaging the engagement portion 63B from the recess 61C of the rotary member 61. Further, an end of the rotary shaft 61A of the rotary member 61, which is attached to the operation knob 62, is released from the insertion portion 62A of the operation knob 62.

As illustrated in FIG. 3, the engagement portion 63B of the locking member 63 is easily released from the recess 61C of the rotary member 61 in the X direction. Then, while the locking member 63 is not engaged from the rotary member 61 with the engagement portion 63B released from the recess 61C, the operation knob 62 can be easily separated from the rotary member 61 in the Z direction.

Further, as illustrated in FIGS. 2 and 3, while the operation knob 62 is attached, the exposed portion 63C of the locking member 63 is exposed to an outside of the operation knob 62, specifically, to a side of the operation knob 62 opposite from the rotary member 61. In other words, since the locking member 63 can be attached from an outside of the operation knob 62, easy attachment of the locking member 63 can be enhanced.

Further, as illustrated in FIG. 3, while the operation knob 62 is attached, the exposed portion 63C of the locking member 63 extends, in the operation knob 62, from an intersection with the rotation axis Rx of the rotary member 61 in the X direction (i.e. the direction orthogonal to the rotation axis Rx). Accordingly, the locking member 63 can be used as a pointer indicating the rotary position of the controller knob 6.

Advantage(s) of Exemplary Embodiment

The controller knob 6 of the DJ mixer 1 according to the present exemplary embodiment described above includes the rotary member 61, the operation knob 62 capped on the rotary member 61 in the first direction (Z direction), and the locking member 63 including the body 63A fitted in a side of the operation knob 62 opposite from the rotary member 61 in the first direction and the engagement portion 63B extending in the second direction (X direction) orthogonal to the first direction to be engaged with the rotary member 61.

According to the above arrangement, the controller knob 6 (rotary operator) can be easily attached and detached according to a purpose while maintaining durability and operational feeling of the controller knob 6. Further, the operation knob 62 and the rotary member 61, even when being made of different materials, can be restrained from being affected by temperature change. In addition, as compared with a case where the operation knob and the rotary member are locked without using the locking member, the requirement for the dimensional accuracy for the operation knob 62 and the rotary member 61 can be lowered, thereby causing less problem in terms of reduction in productivity. Furthermore, as compared with the case where the operation knob and the rotary member are locked without using the locking member, the margin for the dimension of the components involved in attaching the operation knob 62 onto the rotary member 61 can be increased, so that reduction in the risk for the damage or the like of the components can be expected. Still further, the operation knob 62 and the rotary member 61 can be locked only by adding the locking member 63. Accordingly, the above-described advantages can be achieved with the small number of components.

Especially, in the DJ mixer 1 (acoustic device) including the controller knob 6, consumable components and the rotary operator for customization can be easily exchanged while keeping the durability for preventing easy detachment and/or damage even against a hard action by a user (e.g. DJ) and excellent operational feeling for enhancing playability.

According to the present exemplary embodiment, the first direction (Z direction) is a direction along the rotation axis Rx of the controller knob 6 (rotary operator). Accordingly, the locking member 63, which extends in the second direction (X direction) orthogonal to the first direction to be engaged with the rotary member 61, can lock the rotary member 61 and the operation knob 62 to prevent detachment of the operation knob 62 of the controller knob 6.

Further, according to the present exemplary embodiment, at least a part of the body 63A includes the exposed portion 63C to be exposed to an outside of the operation knob 62 when the locking member 63 is fitted in the operation knob 62. Accordingly, the locking member 63 can be attached from the outside of the operation knob 62, thereby enhancing easy attachment of the locking member 63.

According to the present exemplary embodiment, the exposed portion 63C is exposed on a side of the operation knob 62 opposite from the rotary member 61. Accordingly, the locking member 63 can be used as a pointer indicating the rotary position of the controller knob 6. Thus, the same design as that of a typical operation knob can be maintained even when the locking member 63 is added.

Further, the exposed portion 63C of the present exemplary embodiment extends at the side of the operation knob 62 opposite from the rotary member 61 from the intersection with the rotation axis Rx of the rotary member 61 in the direction orthogonal to the rotation axis Rx. Accordingly, by using the locking member 63 as a pointer, operability of the controller knob 6 (rotary operator) can be enhanced.

Modification of Exemplary Embodiment

The rotary operator, which is exemplified by the controller knob 6 in the above-described exemplary embodiment, is not necessarily in a form of the controller knob in the invention. For instance, the invention is suitably applicable to a rotary operator other than the controller knob 6.

The first direction (Z direction), which is a direction along the rotation axis Rx of the controller knob 6 (rotary operator) in the above-described exemplary embodiment, is defined otherwise in some embodiments of the invention. For instance, the invention is suitably applicable to a rotary operator whose first direction (Z direction: i.e. the direction for the operation knob to be detached) is not along the rotation axis of the rotary operator. For instance, the invention is suitably applicable to a linearly movable slide operator used for a fader and the like.

Further, in the above-described exemplary embodiment, at least a part of the body 63A of the locking member 63 exemplarily includes the exposed portion 63C to be exposed to an outside of the operation knob 62 when the locking member 63 is fitted in the operation knob 62. However, the scope of the invention is not limited by the above-described exemplary embodiment. For instance, as long as the locking member 63 is capable of locking the rotary member 61 and the operation knob 62, an entirety of the body 63A is optionally exposed to an outside of the operation knob 62 or no part of the body 63A is optionally exposed to the outside of the operation knob 62.

Further, the shape of the locking member 63 is not limited to the example disclosed by the above-described exemplary embodiment. For instance, two or more hook-shaped parts engageable with the recess 61C of the rotary member 61 are optionally provided on the engagement portion 63B. Further, the locking member 63 is optionally provided by two or more components attachable with each other.

Further, the exposed portion 63C of the invention, which is exemplarily exposed on the side of the operation knob 62 opposite from the rotary member 61 in the above-described exemplary embodiment, is not necessarily configured as in the exemplary embodiment. For instance, instead of using the exposed portion 63C as a pointer, a pointer is optionally provided on the operation knob 62 by printing or the like or, alternatively, the pointer is optionally provided through multi-color molding of the operation knob 62.

In the above-described exemplary embodiment, the rotary member 61 exemplarily includes: the rotary shaft 61A capped with the operation knob 62; the cover 61B covering the rotary shaft 61A and rotatable integrally with the rotary shaft 61A; and the locking member 63 locking the cover 61B and the operation knob 62. However, the invention is not limited by this example. For instance, the cover 61B is optionally not provided. Further, the locking member 63 is optionally configured to lock the rotary shaft 61A and the operation knob 62 irrespective of the presence or absence of the cover 61B. Further, the structure, shape and the like of the cover 61B are not limited to the example disclosed by the above-described exemplary embodiment.

The acoustic device with the above functionality is not necessarily the mixer as described in the exemplary embodiment but is optionally, for instance, a DJ system integrally provided with a mixer and a player or a DJ controller with mixer functions in some embodiments. Further, the invention is not necessarily embodied in a DJ device but is also applicable to a typical acoustic device such as a mixer and an electronic instrument. Further, the invention is suitably applicable to various devices other than acoustic device.

A suitable exemplary embodiment of the invention is detailed above with reference to the attached drawings. However, the scope of the invention is not limited by the exemplary embodiment. It would be obvious for those skilled in the art to which the invention pertains that various modifications and revisions are conceivable within the technical idea described within claims, and it is understood that such modifications and revisions are naturally within the technical scope of the invention.

EXPLANATION OF CODES

1 . . . DJ mixer, 2 . . . microphone operating unit, 3 . . . effect operating unit, 4 . . . master adjuster, 5 . . . equalizer adjuster, 5A . . . first adjusting unit, 5D . . . fourth adjusting unit, 7 . . . controller, 21 . . . headphone jack, 22 . . . headphone sound volume adjuster, 23 . . . mixing adjuster, 24 . . . master effect switching unit, 25 . . . master effect amount adjuster, 26 . . . microphone switching unit, 27 . . . microphone equalizer adjuster, 28 . . . microphone sound volume adjuster, 31 . . . effect switching unit, 32 . . . channel switching unit, 33 . . . effect time setting unit, 34 . . . effect amount adjuster, 35 . . . magnification setting unit, 36 . . . display unit, 41 . . . master sound volume adjuster, 42 . . . level indicator, 43 . . . master sound volume balance adjuster, 44 . . . equalizer switching unit, 45 . . . channel fader switching unit, 46 . . . cross fader switching unit, 51 . . . input switching unit, 52 . . . input channel sound volume adjuster, 53 . . . channel level indicator, 54 . . . high frequency band adjuster, 55 . . . medium frequency band adjuster, 56 . . . low frequency band adjuster, 57 . . . effect adjuster, 58 . . . channel fader, 59 . . . cross fader switching unit, 60 . . . cross fader, 61 . . . rotary member, 61A . . . rotary shaft, 61B . . . cover, 61C . . . recess, 62 . . . operation knob, 62A . . . insertion portion, 62B . . . hole, 62C . . . groove, 63 . . . locking member, 63A . . . first portion, 63B . . . second portion, 63C . . . exposed portion

The invention claimed is:

1. A rotary operator comprising:

a rotary member;

an operation knob capped on the rotary member in a first direction; and a flexible locking member, wherein the flexible locking member includes a body including a portion fitted in a side of the operation knob at a side opposite from the rotary member in the first direction and an engagement portion extending in a second direction orthogonal to the first direction to be engaged with the rotary member, the body includes a base extending in the second direction, a first extending portion, and a second extending portion, the first extending portion and the second extending portion extending from ends of the base in a direction in which the operation knob is capped, and the engagement portion extends from an end of the first extending portion toward the second extending portion.

2. The rotary operator according to claim 1, wherein the first direction is a direction along a rotation axis of the rotary member.

3. The rotary operator according to claim 1, wherein in the flexible locking member fitted in the operation knob, at least a part of the first extending portion comprises an exposed portion that is exposed to an outside of the operation knob.

4. The rotary operator according to claim 3, wherein the exposed portion is exposed on the side of the operation knob at the side opposite from the rotary member.

5. The rotary operator according to claim 3, wherein the first direction is a direction along a rotation axis of the rotary member, the exposed portion extends on the side of the operation knob at the side opposite from the rotary member from a point intersecting the rotation axis of the rotary member in the second direction.

6. The rotary operator according to claim 1, wherein the rotary member comprises:

a rotary shaft capped with the operation knob; and a cover covering the rotary shaft and rotatable integrally with the rotary shaft, and the flexible locking member is configured to lock the cover to the operation knob.

7. An acoustic device comprising the rotary operator according to claim 1.

8. The rotary operator according to claim 1, wherein the operation knob includes a hole defined in the side of the operation knob at the side opposite from the rotary member in the first direction, the base passes through the hole so that a second portion of the base and the second extending portion are received in an interior of the operation knob, and a first portion of the base and the first extending portion are provided outside of the interior of the operation knob along an exterior of the operation knob.

9. The rotary operator according to claim 8, wherein a groove is defined in the exterior of the operation knob and the first portion of the base and the first extending portion are fitted in the groove.

* * * * *